Nov. 7, 1933.  F. F. UEHLING  1,934,388

AUTOMATIC CONTROL APPARATUS

Filed Oct. 18, 1929

INVENTOR
Fritz Frederick Uehling

Patented Nov. 7, 1933

1,934,388

UNITED STATES PATENT OFFICE 1,934,388

AUTOMATIC CONTROL APPARATUS

Fritz Frederick Uehling, Passaic, N. J.

Application October 18, 1929. Serial No. 400,715

16 Claims. (Cl. 175—375)

This invention relates to automatic control apparatus in general and to means for actuating an electric relay by closing and opening the primary circuits thereof without incurring electrical sparking. The invention therefore covers particularly a novel form of relay in combination with means for actuating the relay, the controlling or electric contact elements of which means must be absolutely free from electrical sparking or arcing. As such a means there has been chosen, for the purpose of illustration, an ordinary mercurial thermometer, the mercury in the stem of which closes or opens the circuit or circuits which actuate the relay. The thermometer is located in a medium the temperature of which depends upon a heating element, the heat energy for which is increased or decreased by the action of the relay.

The same numerals refer to the same parts in all of the illustrations.

Figures 1, 2, 3, 4:
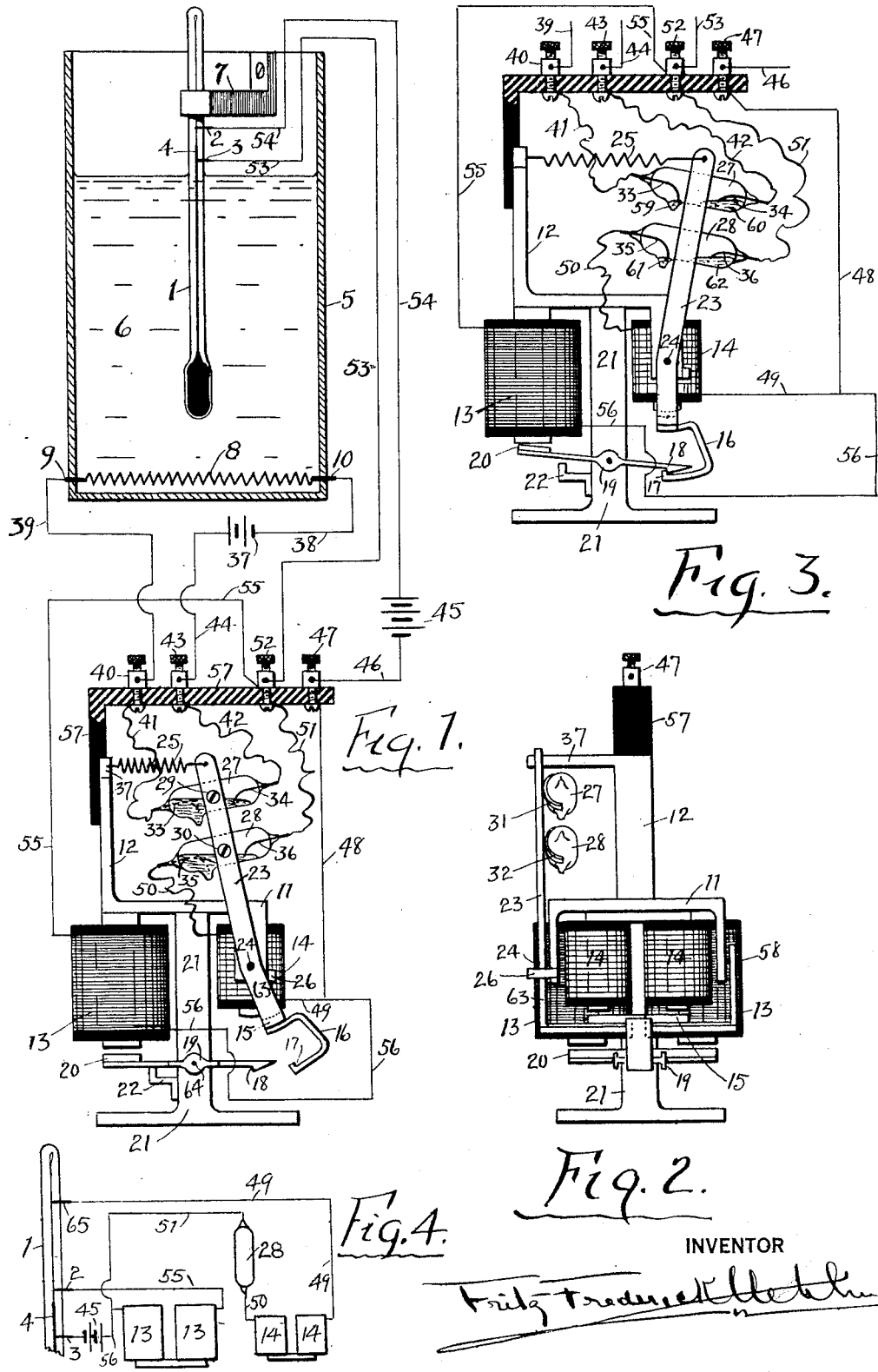
Figure 1 is an elevation partly in cross section, with electrical connections, and illustrates the entire invention.
Figure 2 is a side view of the relay illustrated in Figure 1.
Figure 3 illustrates the same relay with certain of its elements shown in a different position.
Figure 4 illustrates diagrammatically the principal elements of the invention with slight modification in the wiring or circuits.

Attempts have previously been made to utilize the mercurial thermometer as a means for opening and closing electric circuits. Such applications have, however, not been satisfactory, due to the corrosive effect of the electric current on the mercury, the expansion and contraction of which closes and opens an electric circuit. The breaking of any circuit which carries sufficient current to actuate, for example, an electro-magnet of reasonable power, or to do any other work, as, for example, the operation of a switch of comparatively high carrying capacity, is always accompanied by an electric spark. It is this spark which causes oxidation and corrosion of the making and breaking elements, and which it is proposed to eliminate by means of the novel relay description of which is to follow.

The sparking as caused by the opening and closing of an electric circuit is particularly objectionable when the mercury in the stem of a mercurial thermometer is utilized as the opening and closing means of such a circuit. Particular stress is therefore laid on the combination of the relay referred to, with a mercurial thermometer located in a medium the temperature of which may be increased or decreased by a heat element, the energy for which depends upon the opening and closing of an electric circuit by the mercury in the thermometer.

The degree of sparking when a circuit is broken depends primarily on the magnitude of the flow through the circuit. The smaller the flow at a given voltage the less will be the sparking until a point has been reached where the objectionable effect on the elements utilized for making and breaking the circuit is entirely eliminated.

To illustrate the invention I provide a mercurial thermometer 1, Figure 1, which is surrounded by a medium 6 contained in a vessel 5, the thermometer being held in place by means of a bracket 7, as illustrated. The temperature of the medium 6 may be increased or decreased by an electric heater 8 which receives its energy from a battery 37 in a manner to be presently described. The mercurial thermometer is provided with electric contact wires 2 and 3 which are sealed into the stem of the thermometer and extend into the capillary bore of the stem into which the mercury 4 expands to a point depending upon the temperature of the medium 6. The position of the contact wire 2 is such that when the medium reaches a predetermined temperature, for example 150 degrees Fahrenheit, the top of the mercury 4 in the capillary bore will coincide with the end of the contact wire 2 thereby making an electric connection between 2 and 3. This electrical connection closes two circuits. The first circuit which is thus closed starts at battery 45 and continues through wire 46, binding post 47, wire 48, and wire 49, to a pair of electro-magnets 14, from the electro-magnets 14 through a flexible connection 50, to a mercury switch 28, to be referred to later, from the mercury switch 28 through a flexible connection 51, binding post 52, and wire 53 to the electric contact wire 3. When the mercury in the bore of the thermometer extends to the contact wire 2, the circuit continues through the mercury, contact wire 2, and wire 54, back to the battery thus completing the circuit. The second circuit which is closed by the mercury in the thermometer starts at battery 45 and continues through wire 46, binding post 47, wire 48, and wire 56, to a pair of electro-magnets 13. From the electro-magnets 13 the circuit continues through wire 55, binding post 52, and wire 53 to the contact wire 3. When the mercury in the thermometer reaches the contact wire 2, the circuit continues through the mercury, the contact wire 2, and wire 54, back to the battery, thus completing the circuit. The magnets 13 and the magnets 14, Figures 1 and 2, are supported in a fixed position by means of a pedestal 21 to which they are fastened, as illustrated.

Electro-magnets 14 are provided with an armature 15 fastened to a yoke 63, Figures 1 and 2. The yoke is pivoted at 24 and 58, as illustrated. One side of the yoke is provided with an extension arm 23 and is held in its normal position against a stop 26 by means of a spring 25, said spring being fastened at one side to the upper end of the extension arm 23 and at the other side to a fixed arm 37. It thus follows that when the electromagnets 14 are energized the armature 15 will be attracted by the magnets thereby causing said armature with the yoke 36 and its extension arm 23 to rotate in a clockwise direction on the pivots 24 and 58, and when the magnets 14 are deenergized, the spring 25 will cause the armature with its yoke 63 and extension arm 23 to rotate in a counter-clockwise direction until the yoke is again in its normal position against a stop 26.

The electro-magnets 13 are provided with an armature 20, which armature is fastened to one end of a beam 19, Figure 1, said beam being pivoted at 64, as illustrated. The beam 19, at the end opposite the armature, is provided with a trigger 18, as illustrated. The armature side of the beam is slightly heavier than the trigger side so that in its normal position it rests against the stop 22, which stop is fastened to the pedestal 21, as illustrated. It thus follows that when the magnets 13 are energized, the armature 20 will be lifted and the trigger 18 lowered, and when the magnets 13 are deenergized, the armature and trigger will again assume their normal positions, as illustrated in Figure 1.

The mercury switch 28 is fastened to the extension arm 23 of the yoke 63 by means of clamp 32, Figure 2, which clamp is held in position by a screw 30, Figure 1. The mercury switch is of the well-known form which consists of a glass bulb into one end of which is sealed a wire 35 and into the other end of which is sealed another wire 36. The glass bulb contains a globule of mercury which electrically connects the two wires 35 and 36 when the mercury switch is tilted in the position illustrated in Figure 1. When the mercury switch is tilted in the opposite direction as illustrated in Figure 3, the mercury in the bulb divides itself into two globules 61 and 62, thus breaking the electrical connection between the sealed-in wires 35 and 36. It thus follows that when the armature 15 is in its normal position as illustrated in Figure 1, electrical connection through the mercury switch 28 is established, while on the other hand, if the armature 15 is in the position as illustrated in Figure 3, electrical connection through the mercury switch will be destroyed.

Let us assume that the moving elements of the relay are now in the position as illustrated in Figure 1. As previously stated, when electrical connection is made between the contact wires 2 and 3 by the mercury in the thermometer, both the circuit which includes the mercury switch 28 and the electro-magnets 14, and the circuit which includes the electro-magnets 13, will be closed. When this happens the armature 20 of the magnets 13 will be lifted and the trigger 18 will be lowered, while simultaneously or approximately so, the armature 15 will be attracted, and the yoke 63 and mercury switch 28 which are integral with the armature will be rotated in a clockwise direction. At the bottom of the yoke 63 is fastened an arm 16 at the end of which is a catch 17, as illustrated in Figure 1. The armature with its yoke 63 will continue to rotate in a clockwise direction until it has reached the position illustrated in Figure 3, in which position electrical connection through the mercury switch 28 has been destroyed, thereby opening the circuit which includes the electro-magnets 14. The magnets 14 having thus been deenergized, there will be no further magnetic influence and the yoke will tend to turn back to its normal position. This will, however, be prevented by the trigger 18 which acts as a latch over the catch 17, as illustrated in Figure 3. Although the circuit which includes the magnets 14 has been broken through the mercury switch 28, the yoke 63 will remain in this cocked position as long as the electro-magnets 13 are energized. The magnets 13 will remain energized as long as the mercury in the thermometer remains sufficiently high to electrically connect the contact wires 2 and 3. It will be noted that although electric connection between 2 and 3 closed the circuit which tilted the yoke 63, this circuit was immediately broken by the mercury switch 28 when the yoke reached the position illustrated in Figure 3. On the other hand the circuit through the magnets 13 will remain closed until the mercury in the thermometer recedes to a point below the contact wire 2. When this happens, the magnets 13 will be deenergized, the armature 20 will drop, and the trigger 18 will lift thereby releasing the catch 17, thus permitting the yoke 63 with its mercury switch 28 to return to its normal position as illustrated in Figure 1.

A second mercury switch 27, Figure 3, similar in every respect to the mercury switch 28 is also fastened to the extension arm 23. The sealed-in wires 33 and 34 and the globules of mercury 59 and 60 of the mercury switch 27 correspond respectively with the sealed-in wires 35 and 36 and the globules of mercury 61 and 62 of the mercury switch 28. The switch 27 is also similarly fastened to the extension arm 23 by means of a clamp 31 and a screw 29. The circuit which includes the switch 27 starts at battery 37 and continues through wire 38 through an insulated post 10, to the heater 8, from the heater 8 through the insulated post 9, wire 39, binding post 40 and flexible connection 41, to the mercury switch 27, and from the mercury switch 27 through flexible connection 42, binding post 43, and wire 44, back to the battery, thus completing the circuit. It thus follows that when the yoke 63 is in the position illustrated in Figure 1, the circuit through the heater will be closed and when the yoke 63 is in the position illustrated in Figure 3, the circuit through the heater will be opened. In other words when the relay is in the position illustrated in Figure 1, the heater 8 will be energized thereby heating the medium 6 until said medium reaches a temperature causing the mercury in the thermometer to expand to a point coincident with the contact wire 2. When this happens, the mercury simultaneously closes the circuit through the electro-magnets 13 and the circuit through the mercury switch 28 and the electro-magnets 14. The action of the magnets 14 will tilt the mercury switches to the new position shown in Figure 3, in the manner already stated. This position of the mercury switch 28 will break the circuit through the magnets 14. The mercury switches 27 and 28 will, however, remain in this open position due to the locking effect of the trigger 18 against the catch 17, as long as the magnets 13 are energized, and as previously stated, the magnets 13 will remain energized until the mercury in the thermometer again drops below the contact wire 2 at which time the latch which holds the yoke in its clockwise position is released by the dropping of the armature 20, at which time the spring 25 will again pull the mercury switches to their normal position as illustrated in Figure 1.

It will be noted that the circuit which does all the work of opening the switches 28 and 27 is closed by contact between the mercury in the thermometer and the contact wire 2, but that the opening of this circuit is immediately and automatically accompanied by the tilting of switch 28. In other words the circuit which does the work of actuating the mercury switches is merely closed by contact between the mercury and the contact wire 2. The circuit closing action between the mercury in the thermometer and the contact wire 2 causes no sparking and therefore has no detrimental effect, and since the electrical connection through the switch 28 has been disturbed, the circuit through the magnets 14 will be dead at the time the mercury recedes from the contact wire 2. The circuit which includes the magnets 13 is on the other hand both closed and opened by making and breaking contact respectively between the mercury and the contact wire 2. The magnets 13 are, however, wound with very heavy electrical resistance so that the flow through these magnets is infinitesimal as compared with the flow required to tilt the mercury switches. The armature 20 is very light and nearly balanced by the weight of the trigger 18, so that a very small amount of current is required to lift the armature 20. The magnets 13 can be so designed that the current necessary to do the negligible amount of work required to lift the armature 20, is so small that no objectionable effect whatsoever will be experienced by breaking the circuit which includes these magnets when the mercury leaves the contact wire 2. It is thus obvious that the only circuit which is broken by the mercury in the thermometer is the circuit which transmits the delicate flow through the magnets 13. For this reason a mercury thermometer as described may be used indefinitely as a controlling element to increase and decrease the heat input to a medium which is to be maintained at a constant temperature.

It is obvious that although in the above description I have seen fit to cause the mercury in the thermometer to simultaneously close the circuit through magnets 13 and the circuit through magnets 14, it is also possible, without in any way departing from the invention, to provide an additional contact wire 65, Figure 4, so that the circuit through magnets 13 will be closed when the mercury reaches the contact wire 2 and the circuit through magnets 14 and the mercury switch 28 will be closed when the mercury reaches the contact wire 65. In special cases, such a modification may have definite advantages. In such a modified form, the circuit through the magnets 13 will be closed first, Figure 4, thus lowering the trigger 18, Figure 1, thereby placing it in position to latch with the catch 17 when the mercury reaches the contact wire 65, Figure 4, thus closing the circuit through the magnet 14 which tilts the yoke 63 in the manner already stated. As soon as the yoke has thus been tilted, electrical contact through the switch 28 will be broken and the circuit will be dead, thereby preventing a spark between the mercury and the contact wire 64 as the mercury recedes from this wire. The relay will, however, remain in the position illustrated in Figure 3 until the mercury drops below the contact wire 2, Figure 4, at which time the magnets 13 will be deenergized and the relay will reassume its normal position as previously stated and as illustrated in Figure 1.

It is further obvious that although I have utilized the mercury in a thermometer and a contact wire sealed into the stem of the thermometer as the means for making and breaking the primary circuit or circuits, any other form of contact mechanism or contact pieces might be used to accomplish the same results without in any way departing from this invention.

Having thus described my invention what I claim as new and desire to secure by Letters Patent is:

1. In a device of the class described, the combination with an electric circuit, of a second electric circuit, means for simultaneously closing the first and second circuits, a switch in the second circuit, means for opening the switch controlled by the second circuit and means for closing the switch controlled by the first circuit.

2. In a device of the class described, the combination with a switch, of an electrical means for closing the switch, a second electrical means for opening the switch, a second switch, the closing action of which is controlled by the first electrical means, and the opening action of which is controlled by the second electrical means, a mercurial thermometer consisting of a bulb containing mercury and a capillary tube into which the mercury expands by the application of heat, a contact wire sealed into the tube, a second contact wire sealed into the tube, an electric circuit which includes both contact wires, the mercury and the first electrical means, and a second electric circuit which includes both contact wires, the mercury, the said switch and the second electrical means.

3. In a device of the class described, the combination with a switch, of electrical means for closing the switch, a second electrical means for opening the switch, a second switch, the closing action of which is controlled by the first electrical means and the opening action of which is controlled by the second electrical means, a mercurial thermometer consisting of a bulb containing mercury and a capillary tube into which the mercury expands by the application of heat, a contact wire sealed into the tube, a second contact wire sealed into the tube, a third contact wire sealed into the tube, an electric circuit which includes the first and second contact wires, the mercury, and the first electrical means, and a second electric circuit which includes the first and third contact wires, the mercury, the second switch, and the second electrical means.

4. In a device of the class described, the combination with a movable arm, of a mercurial switch fastened to the arm, a stop against which the arm rests when in a given position, a spring for holding the arm against the stop, an electromagnet for pulling the arm away from the stop against the action of the spring, a latch for holding the arm in a second given position against the action of the spring, a second electro-magnet for releasing the latch, an electric circuit which includes the second electro-magnet, and a second electric circuit which includes the first electromagnet and the switch.

5. In a device of the class described, the combination with a movable arm, of a mercurial switch fastened to the arm, a stop against which the arm rests when in a given position, a spring for holding the arm against the stop, an electromagnet for pulling the arm away from the stop against the action of the spring, a latch for holding the arm in a second given position against the action of the spring, a second electro-magnet for releasing the latch, an electric circuit which includes the second electro-magnet, a second electric circuit which includes the first electromagnet and the switch, a second mercurial switch fastened to the movable arm, and a third circuit which includes the second mercurial switch.

6. In a device of the class described, the combination with an arm pivoted on a fixed axis, a stop against which the arm rests when in a given position, a spring for holding the arm against the stop, a trigger, a catch on the arm which is held by the trigger when the arm is in a second given position, an electro-magnet for moving the arm away from the stop against the action of the spring to its second position, a second electro-magnet for actuating the trigger, a mercurial switch fastened to the arm, a second mercurial switch fastened to the arm, an electric circuit which includes the first electro-magnet and the first mercurial switch, a second electric circuit which includes the second electro-magnet, a third electric circuit which includes the second mercurial switch, means for opening and closing the first electric circuit, and means for opening and closing the second electric circuit.

7. In a device of the class described, the combination with a circuit containing an electric means, of a second circuit containing a second electric means, means for closing the two circuits simultaneously, and means for opening the second circuit controlled by the second electric means.

8. In a device of the class described, the combination with a switch, of a second switch, an electric means for closing both switches simultaneously, a second electric means for opening both switches simultaneously, a circuit which includes the first electric means, a second circuit which includes the second electric means and the first switch, means for closing the first and second circuits simultaneously, means for opening the first circuit independently of the second circuit, and a third circuit which includes the second switch.

9. In a device of the class described, the combination with a switch, of an electro-magnet for opening the switch, a circuit which includes the magnet and switch, a second electro-magnet for holding the switch in its open position when the magnet is deenergized, a second circuit which includes the second magnet, means for closing both circuits simultaneously, and means for opening the second circuit independently of the first circuit.

10. In a device of the class described, the combination with an electro-magnet, of a second electro-magnet, a circuit which includes both of the magnets in parallel, a switch actuated by the first magnet for cutting the first magnet out of the circuit, means actuated by the second magnet for closing the switch, and independent means for opening and closing the circuit.

11. In a device of the class described, the combination with a movable arm, of an electro-magnet for moving the arm to a given position when the magnet is energized, means for moving the arm to a second given position when the magnet is deenergized, a second electro-magnet, a latch which is held in a given position by the second magnet when this magnet is energized, a weight for holding the latch in a second given position when the second magnet is deenergized, a catch on the arm which is held by the latch when the second magnet is energized and released by the latch when the second magnet is deenergized, a switch actuated by the arm, a circuit which includes the switch and the first magnet, a circuit which includes the second magnet, and means for closing the two circuits simultaneously.

12. In a device of the class described, the combination with a thermometer containing mercury, of a wire sealed into the thermometer for making contact with the mercury, a second wire sealed into the thermometer for making contact with the mercury, a third wire sealed into the thermometer for making contact with the mercury, an electro-magnet, a circuit which includes the electro-magnet, the mercury, the first contact wire and the second contact wire, a second electro-magnet and a second circuit which includes the second electro-magnet, the mercury, the second wire, and the third wire, a switch in the second circuit, a movable arm actuated by the second magnet to open the switch, and a latch which holds the arm in a given position when the first magnet is energized and releases the arm when said magnet is deenergized.

13. In a device of the class described, the combination with a circuit, the opening and closing of which is effected by a single contact means, of a second circuit which is closed by the same contact means but opened by a second contact means, an electro-magnet in the second circuit for actuating the second contact means, a latch for holding the second contact means in its open position, and an electro-magnet in the first circuit for actuating the latch.

14. In a device of the class described, the combination with a movable arm, of a mercurial switch fastened to the arm, a stop against which the arm rests when in a given position, a spring for holding the arm against the stop, an electro-magnet for pulling the arm away from the stop against the action of the spring, a latch for holding the arm in a second or cocked position against the action of the spring, a weight for pulling the latch to release the arm, a second electro-magnet for holding the weight to maintain the cocked position of the arm, an electric circuit which includes the second electro-magnet, a second electric circuit which includes the first electro-magnet and the switch, and means for closing the first and second circuits simultaneously.

15. In a device of the class described, the combination with a movable arm, of a mercurial switch fastened to the arm, a stop against which the arm rests when in a given position, a spring for holding the arm against the stop, an electro-magnet for pulling the arm away from the stop against the action of the spring, a latch for holding the arm in a second or cocked position against the action of the spring, a weight for pulling the latch to release the arm, a second electro-magnet for holding the latch against the action of the weight to maintain the cocked position of the arm, an electric circuit which includes the second electro-magnet, a second electric circuit which includes the first electro-magnet and the mercurial switch, a second mercurial switch fastened to the movable arm, a third circuit which includes the second mercurial switch, and means for closing the first and second circuits simultaneously.

16. In a device of the class described, the combination with an electrical means, of a second electrical means, an electrical circuit which includes the first and second electrical means in parallel, an electric switch in series with the first electrical means and in parallel with the second electrical means, means for opening the switch actuated by the first electrical means, means for closing the switch actuated by the second electrical means, a heating element, and means for opening and closing the circuit controlled by the heating element.

FRITZ FREDERICK UEHLING.